Nov. 16, 1943.     B. E. SHAW     2,334,513
CONTROL TIMER FOR REFRIGERATING SYSTEMS
Filed June 30, 1941     2 Sheets-Sheet 1
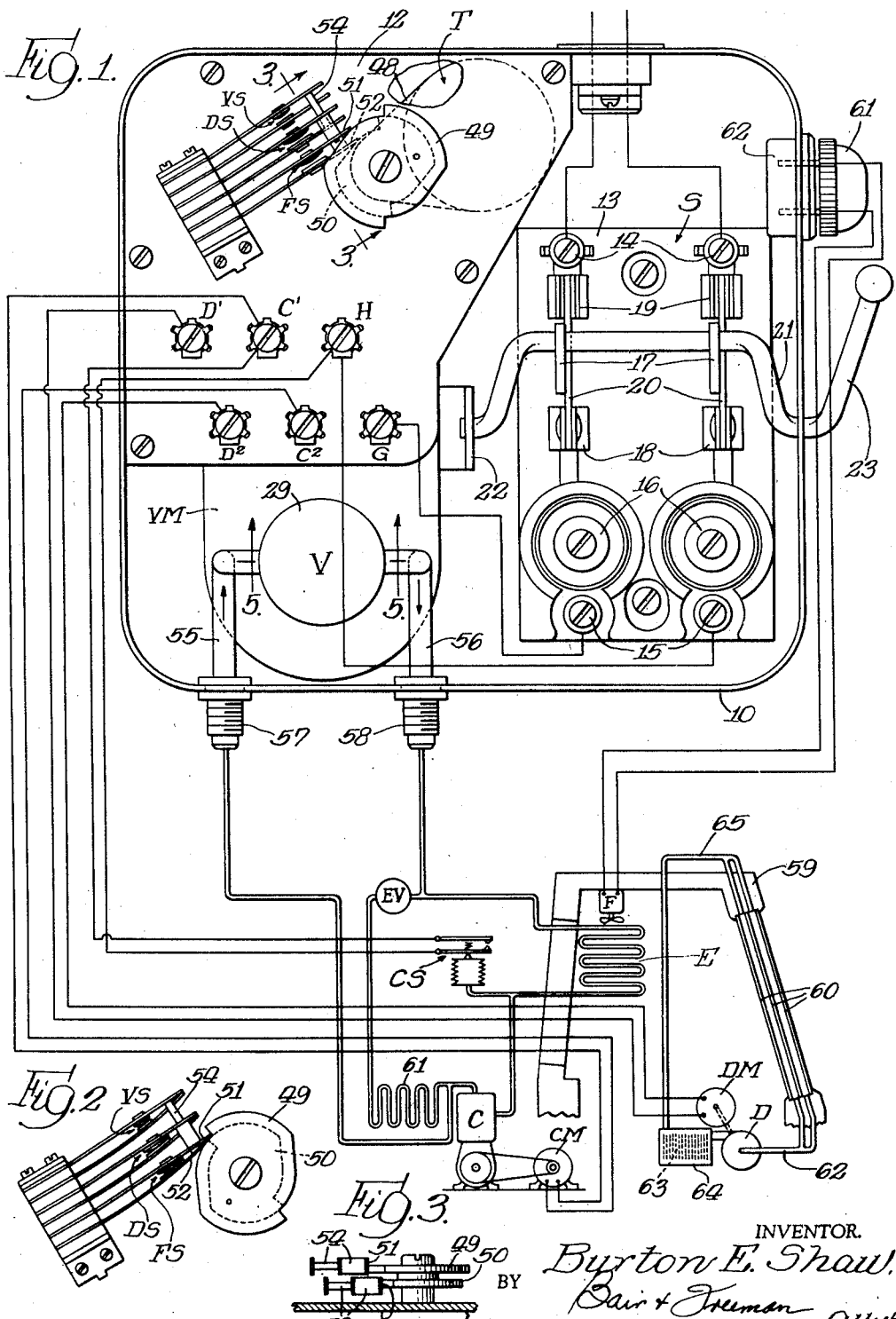
INVENTOR.
Burton E. Shaw
BY Bair + Freeman
Atty's Nov. 16, 1943.　　　　B. E. SHAW　　　　2,334,513
CONTROL TIMER FOR REFRIGERATING SYSTEMS
Filed June 30, 1941　　　2 Sheets-Sheet 2
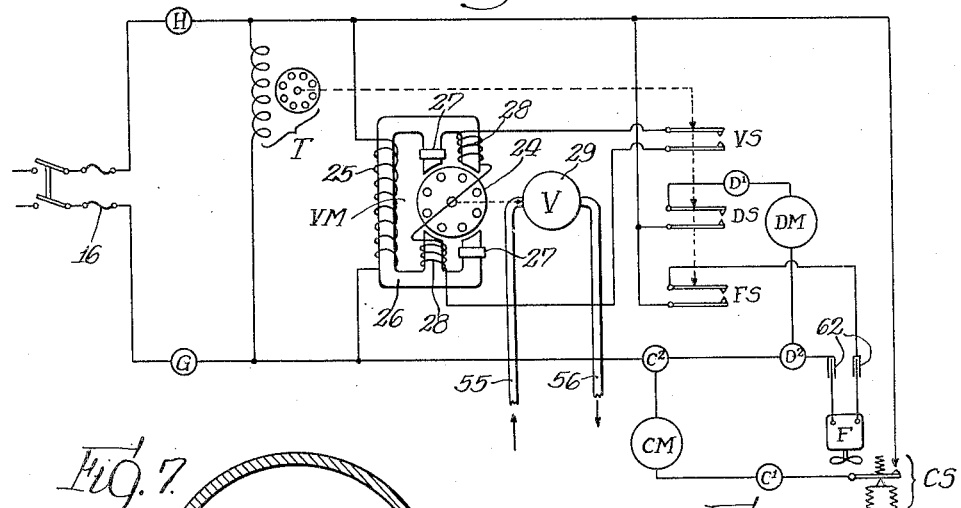
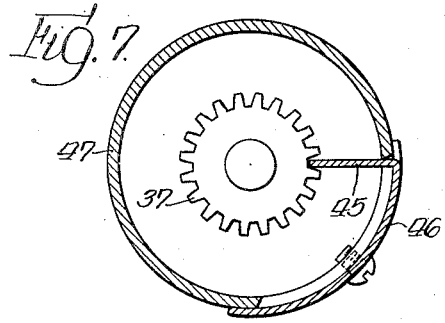
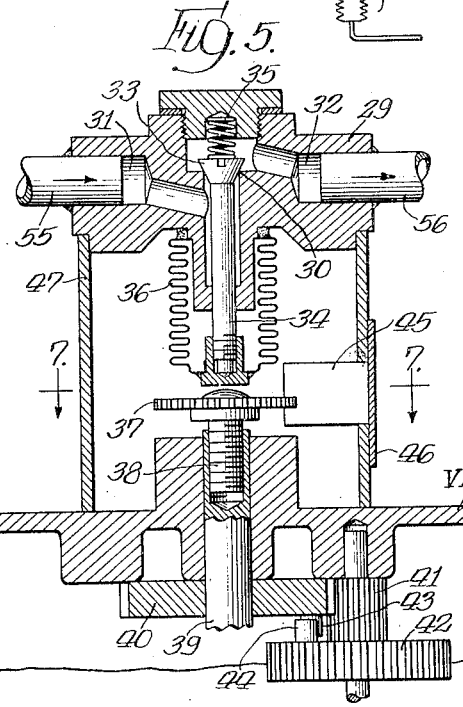
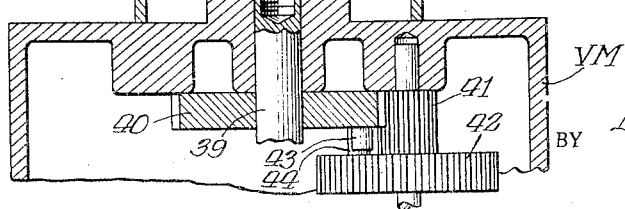
INVENTOR.
Burton E. Shaw,
BY Blair & Freeman Attys.

Patented Nov. 16, 1943

2,334,513

UNITED STATES PATENT OFFICE 2,334,513

CONTROL TIMER FOR REFRIGERATING SYSTEMS

Burton E. Shaw, Bristol, Ind., assignor to Penn Electric Switch Co., Goshen, Ind., a corporation of Iowa Application June 30, 1941, Serial No. 400,427

15 Claims. (Cl. 62—4)

My present invention relates to a control timer for refrigeration systems which effects, each twelve hour or other predetermined period of time, automatic defrosting of the evaporator and dehydration of the air space between the glasses of a display compartment of a display case or the like.

One object of my invention is to provide a structure of this character in the form of a unitary control box including a fused entrance switch in addition to a timer, various switches operated thereby, a valve used in the defrosting system, a motor for operating such valve, necessary switches controlled by the timer for the valve motor, dehydrating mechanism and a fan (if used) for circulating the air over the evaporator to aid in the defrosting operation, together with terminals for the compressor motor and compressor switch therefor.

A further object is to provide a control timer of the general character above referred to which has the mechanism mentioned compactly arranged in a single casing with suitable terminals therein for ready connection to the compressor motor, fan and dehydrating means, and which makes for a permanent installation.

Still a further object is to provide a novel valve mechanism which may be motor operated by a small motor of relatively low horse power and of simple and inexpensive construction.

With these and other objects in view, my invention consists in the construction, arrangement and combination of the various parts of my device whereby the objects contemplated are attained, as hereinafter more fully set forth, pointed out in my claims and illustrated in the accompanying drawings. Although the invention is susceptible of a variety of embodiments, it is unnecessary to fully describe and illustrate more than one in order to give a full understanding of the invention both from its structural and functional standpoints. Accordingly, I have illustrated a preferred and desirable embodiment of the invention in the accompanying drawings, in which Figure 1 is a front view of a control timer embodying my invention, showing the cover thereof removed and showing diagrammatically the electrical and refrigerant connections with a refrigeration system and a display case;

Figure 2 is a view similar to the upper left hand portion of Figure 1, showing a cam and a series of switches operated thereby in a different position from that of Figure 1;

Figure 3 is a sectional view on the line 3—3 of Figure 1, showing the relationship of the switch blades with the cam mechanism;

Figure 4 is a diagrammatic view of the entire electrical circuit of the system;

Figures 5 and 6 are enlarged sectional views on the line 5—5 of Figure 1, showing details of the valve structure in closed and open positions respectively, and Figure 7 is a sectional view on the line 7—7 of Figure 5.

On the accompanying drawings, I have used the reference numeral 10 to indicate a casing wherein the mechanism of my control timer is mounted. Within the casing 10 a panel 12, preferably of insulating material, is supported in a suitable position spaced from the back of the casing to permit a valve motor VM to assume a position between the panel and the back of the casing. An entrance switch is provided for the current supplied to the timer mechanism. The entrance switch is indicated generally at S.

The entrance switch S comprises a base 13 having terminals 14 and 15 mounted thereon. Also mounted on the base are a pair of fuse sockets to receive fuses 16, and a pair of switch blades 17 pivoted to terminals 18 and adapted to enter terminals 19 in "knife switch" manner. Insulating elements 20 are mounted on the blades 17 for coaction with a switch operating crank 21. The crank 21 is pivoted in the right hand side wall of the casing 10 and in a perforated ear 22 and terminates in a control lever 23, whereby the entrance switch S may be closed or opened, as desired, from outside the casing 10.

The valve motor VM consists of a motor of any desired reversing type, such as shown diagrammatically in Figure 4. The rotor of the motor is indicated at 24 and a constantly energized field coil 25 is provided on the stator 26 of the motor. Shading rings 27 cause the motor to rotate in one direction. Coils 28, when short circuited by a valve switch VS, cause opposite rotation of the rotor 24, the coils 28 being supplied with current by induction from the coil 25 and their effect predominating that of the shading rings 27. Although I have described a specific type of reversing motor, it is obvious that any type of reversing or spring or weight-returned motor of the type that is not reversing could be used instead of the construction shown.

The valve operated by the valve motor VM is indicated generally at V. The valve V consists of a body portion 29 having therein a seat 30. Inlet and outlet passages 31 and 32 communicate with opposite sides of the seat 30. A valve plug 33 formed on a valve stem 34 is constrained to normally seat against the seat 30 by a spring 35. The stem 34 is sealed relative to the valve body 29 by a flexible bellows 36.

I provide a valve actuator in the form of a pinion 37 mounted on a stem 38 which is treated in a valve driving shaft 39. The shaft 39 is driven by a gear 40 meshing with a gear 41, which gears, together with a third gear 42, form part of a step-down gear train for connecting the rotor 24 with the valve driving shaft 39. Since the gear train forms no part of my present invention, I have not illustrated it completely, but have shown only enough of the gears to illustrate stop pins 43 and 44 formed on the gears 40 and 42, respectively. These pins engage each other to limit rotation of the shaft 39, for instance, to two revolutions.

Rotation of the pinion 37 is prevented, and thereby its longitudinal movement is effected by rotation of the shaft 39. The means to prevent rotation of the pinion 37 consists of a finger 45 extending from a plate 46. The plate 46 is secured to a cylindrical support 47 for the valve body 29 with respect to the casing of the valve motor VM.

The switch VS and two other switches DS and FS are operated by a timer T. The timer T is preferably electrically driven and continuously operated by a connection across the supply line. Suitable step-down gearing arranged in a housing 48 drives a pair of cams 49 and 50 from the timer T at a greatly reduced speed. For instance, the cams may rotate once each twenty-four hours, and by being provided with double cam lobes they operate the switches VS, DS and FS each twelve hour period. For operating the switches VS, DS and FS from the cams 49 and 50, the switch FS has a pair of spring blades 51 and 52 coacting with the cams 49 and 50, respectively. Whenever both blades are up or down, the circuits are open, as shown in Figure 1. Whenever the blade 51 is down and the blade 52 is up, however, as shown in Figure 2, the switches are closed. The switches VS and DS are operated from the blades 51 and 52 by shouldered thrust pins 53 and 54, respectively. These pins are interposed between the blades of the switches VS and FS, with their shoulders engaging the blades of the switch DS.

The valve V has inlet and outlet conduits 55 and 56 connected therewith and terminating in fittings 57 and 58 for connection to the refrigerating system, as will be hereinafter described. The system to which my control timer is connected is shown diagrammatically in Figure 1. It consists of a display case or the like 59, having glasses 60 through which the articles in the case are displayed. An evaporator E is mounted in the case 59 and is supplied with refrigerant from a compressor C and a condenser 61 through the usual expansion valve EV. A compressor motor is illustrated at CM. A compressor switch CS is provided for automatically controlling the motor CM. The switch CS may be responsive to temperature of the evaporator E or to low side pressure or the like, the latter alternative being illustrated.

A fan F may be provided for circulating air over the evaporator E to aid in the defrosting operation. The fan F may be electrically connected to a plug-in fitting 61 adapted to coact with a socket fitting 62 mounted in the side of the casing 10. Dehydrating means for the space between the glasses 60 may be provided in the form of a dehydrating blower D operated by a dehydrating motor DM. The blower D receives air through conduit 62 and discharges it through chemical grids 63 or the like in a casing 64. The air then returns through conduits 65 to the space between the glasses 60. The chemical grids 63 absorb the moisture from the air.

*Practical operation*

In the operation of my control timer, assuming the entrance switch S closed, the timer T is constantly energized and therefore operates constantly. The field coil 25 of the valve motor VM is constantly energized and therefore causes the rotor 24 to rotate in one direction, as to the position shown in Figure 5, under the influence of the shading rings 27. The stop pins 43 and 44 stop the pinion 37 in a position spaced from the stem 34 so that the spring 35 may retain the valve 33 closed against the seat 30. The position of the pinion 37 with respect to the stem 34 may be adjusted by removing the plate 46 and rotating the pinion 37 to a new position, and then replacing the plate so that the finger 45 enters the notch between two teeth of the pinion 37.

The compressor C will cycle in the usual manner for supplying refrigerant through the expansion valve EV to the evaporator E, such cycling being automatically effected by operation of the compressor switch CS in the usual manner.

Each twelve hour period, the cams 49 and 50 will assume the position shown in Figure 2, thus closing the switches VS, DS and FS. Closure of the valve switch VS causes the valve motor VM to rotate in an opposite direction, due to energization of the shading coils 28. Such rotation will continue until the position of Figure 6 is reached, with the pins 43 and 44 again engaging each other and the pinion 37 adjusted longitudinally to open the valve 33 against the bias of the spring 35. Since the valve V is now open, relatively warm refrigerant will flow directly from the compressor C through the valve and into the evaporator without passing through the condenser and expansion valve. The result will be a warming up of the evaporator coil E, thus melting the frost on it.

Closure of the switch FS causes the fan F to operate for circulating air over the evaporator C, thus aiding in the defrosting operation. The drops of the cams 49 and 50 are so spaced that the closed switch position of Figure 2 will be assumed for a predetermined period of time, sufficiently long to insure complete defrosting of the evaporator E under the influence of warm refrigerant flowing through it and air being circulated over it by the fan F.

Closure of the switch DS causes the dehydrating motor DM to be energized, thereby operating the dehydrating blower D and causing air to be withdrawn from between the glasses 60, passed through the chemical grids 63 to extract its moisture, and returned into the spaces between the glasses. Thus, my timer control effects automatic defrosting of the evaporator and dehydration of the air spaces between the glasses of the display case so as to prevent them from fogging.

At the end of the timing period, the cam 50 drops the switch blade 52, which results in the switches VS, DS and FS opening. Opening of the switch VS opens the circuit of the shading coils 28 so that the shading rings 27 effect rotation of the rotor 24 in the opposite direction, to close the valve as in Figure 5, the stop pins 43 and 44 eventually stopping the valve motor VM.

The rotor 24 still tends to rotate, but is stalled by the stop pins.

Opening of the switches DS and FS de-energizes the dehydrating motor DM and the fan F, respectively. The refrigeration system then continues to operate for the next twelve hours in the usual cycling manner, under control of the compressor switch CS. At the end of this period, the cycle of defrosting and dehydrating operations is repeated, as already described.

Some changes may be made in the construction and arrangement of the parts of my device without departing from the real spirit and purpose of my invention, and it is my intention to cover by my claims any modified forms of structure or use of mechanical equivalents which may be reasonably included within their scope without sacrificing any of the advantages thereof.

I claim as my invention:

1. In a control timer for refrigeration systems, a timer mechanism, a valve switch, a fan switch and a dehydrator switch, each controlled by said timer mechanism to all simultaneously close for a predetermined period of time after elapse of a predetermined period of time, a valve having an inlet from a refrigerant compressor and an outlet to an evaporator supplied with refrigerant from said refrigerant compressor, a valve motor for operating said valve, said valve motor being controlled by said valve switch, a fan for circulating air over said evaporator to aid in defrosting the same, said fan being controlled by said fan switch, dehydrating means for effecting dehydration of the space between the glass walls of a display casing or the like, said dehydrating means including a motor controlled by said dehydrating switch.

2. A control timer for refrigeration systems comprising a timer mechanism, a valve switch and a dehydrator switch, each controlled by said timer mechanism to simultaneously close for a time period after elapse of a predetermined period of time, a valve having an inlet from a refrigerant compressor and an outlet to an evaporator supplied with refrigerant from said refrigerant compressor, a valve motor for operating said valve, said valve motor being controlled by said valve switch, and dehydrating means for effecting dehydration of the space between the glass walls of a display casing or the like, said dehydrating means including a motor controlled by said dehydrating switch.

3. In a control timer, a timer mechanism, a valve switch and a dehydrator switch, each controlled by said timer mechanism, a valve shunted around the expansion valve of a refrigeration system, a valve motor for operating said valve, said valve motor being controlled by said valve switch, and dehydrating means electrically operated for effecting dehydration of a space, said dehydrating means being controlled by said dehydrating switch.

4. In a control timer for refrigeration systems, a timer mechanism, a valve switch and a circulating means switch, each controlled by said timer mechanism, a valve having an inlet from a refrigerant compressor and an outlet to an evaporator, a valve motor for operating said valve, said valve motor being controlled by said valve switch, and means for circulating air over said evaporator to aid in defrosting the same, said means being controlled by said circulating means switch.

5. A control timer comprising a timer mechanism, a valve switch, a fan switch and a dehydrator switch, each controlled by said timer mechanism for simultaneous closing at the ends of predetermined periods of time, a valve shunted around the condenser and expansion valve of a refrigeration system, a valve motor for operating said valve, said valve motor being controlled by said valve switch, means for circulating air over said evaporator to aid in defrosting the same, said means being controlled by said fan switch, dehydrating means electrically operated for effecting dehydration of a space, said dehydrating means being controlled by said dehydrating switch.

6. A control timer comprising a timer mechanism, a valve switch and a fan switch, each controlled by said timer mechanism to close for a timed period after elapse of a predetermined period of time, a valve having an inlet from a refrigerant compressor and an outlet to an evaporator, a valve motor for operating said valve, said valve motor being controlled by said valve switch, and a fan for circulating air past said evaporator to aid in defrosting the same, said fan being controlled by said fan switch.

7. In a control timer, a timer mechanism, a dehydrator switch controlled thereby to close periodically, a dehydrating means including a motor for operating said means to cause it to effect dehydration of the space between the glass walls of a display case or the like, said dehydrating motor being controlled by said dehydrating switch.

8. In a control timer for refrigerating systems, a timer mechanism, a valve switch controlled thereby, and dehydrating means electrically operated for effecting dehydration of a space in the casing of a display case or the like, said dehydrating means being controlled by said dehydrating switch.

9. In a control timer for refrigeration systems, a timer mechanism, a circulation switch and a dehydrator switch, each controlled by said timer mechanism to simultaneously close periodically, means for circulating air over an evaporator to aid in defrosting the same, said means for circulating air being controlled by said circulation switch, and dehydrating means electrically operated for effecting dehydration of the space between the glass walls of a display case or the like in which said evaporator is mounted, said dehydrating means being controlled by said dehydrating switch.

10. A control timer for refrigeration systems comprising a timer mechanism, a fan switch and a dehydrator switch, each controlled by said timer mechanism, a fan for circulating air over an evaporator to defrost the same, said fan being controlled by said fan switch, and dehydrating means including a motor for operating the same, said motor being controlled by said dehydrating switch.

11. In a control timer for refrigeration systems, a timer mechanism, a valve switch controlled thereby to close periodically, a valve having an inlet from a refrigerant compressor and an outlet to an evaporator supplied with refrigerant from said refrigerant compressor, and a motor for operating said valve, said motor being controlled by said valve switch.

12. A control timer for refrigeration systems comprising a timer mechanism, a valve switch controlled thereby, a valve shunted around the condenser and expansion valve of a refrigeration system, and a motor for operating said valve, said valve motor being controlled by said valve switch.

13. Valve operating means comprising a drive shaft, a valve actuator having a threaded connection therewith, means coacting with said valve actuator to permit longitudinal but prevent rotational movement thereof, and a spring closed valve, said valve actuator, upon movement longitudinally in one direction effected by rotation of said drive shaft in one direction, engaging said valve to open the same, reversal of said drive shaft effecting opposite longitudinal movement of said valve actuator to permit said valve to close.

14. Valve operating means comprising a driving shaft, a valve actuator having a threaded connection therewith, means coacting with said valve actuator to permit longitudinal but prevent rotational movement thereof, and a spring closed valve adapted to be opened by said valve actuator upon movement longitudinally thereof.

15. Valve operating means comprising a driving shaft, a valve actuator having a threaded connection therewith, a pinion carried by said valve actuator, stationary means coacting with a tooth of said pinion to permit longitudinal but prevent rotational movement thereof, and a spring closed valve positioned with respect to said valve actuator to be opened thereby upon movement longitudinally of the actuator effected by rotation of said valve driving shaft.

BURTON E. SHAW.